United States Patent
McColloch

(10) Patent No.: US 9,235,018 B2
(45) Date of Patent: Jan. 12, 2016

(54) OPTICAL COMMUNICATIONS CARD, AN OPTICAL COMMUNICATIONS SYSTEM, AND METHODS AND APPARATUSES FOR PROVIDING HIGH-DENSITY MOUNTING OF OPTICAL COMMUNICATIONS CARDS

(75) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 461 days.

(21) Appl. No.: 13/483,715

(22) Filed: May 30, 2012

(65) Prior Publication Data

US 2013/0322887 A1  Dec. 5, 2013

(51) Int. Cl.
G02B 6/36 (2006.01)
H04B 10/00 (2013.01)
H02B 1/00 (2006.01)
G02B 6/42 (2006.01)
H04B 10/40 (2013.01)
G02B 6/43 (2006.01)

(52) U.S. Cl.
CPC .............. *G02B 6/4284* (2013.01); *G02B 6/423* (2013.01); *G02B 6/4246* (2013.01); *G02B 6/4249* (2013.01); *G02B 6/43* (2013.01); *H04B 10/00* (2013.01); *H04B 10/40* (2013.01)

(58) Field of Classification Search
CPC ...... H04B 10/00; H04B 10/12; H04B 10/801; H04B 10/803; G02B 6/423; G02B 6/428; G02B 6/4284; G02B 6/43; G02B 6/4246; G02B 6/4249; G02B 6/4292
USPC ........ 398/135–142, 164, 115; 385/14, 24, 49, 385/53, 76, 88–92, 134–135, 139
See application file for complete search history.

(56) References Cited

U.S. PATENT DOCUMENTS

| | | | |
|---|---|---|---|
| 6,257,771 B1 * | 7/2001 | Okayasu | 385/89 |
| 6,580,865 B1 * | 6/2003 | Doorn | 385/134 |
| 6,705,879 B2 | 3/2004 | Engel et al. | |
| 7,178,996 B2 | 2/2007 | Malagrino, Jr. et al. | |
| 8,036,500 B2 | 10/2011 | McColloch | |
| 8,053,667 B2 | 11/2011 | Chen et al. | |
| 8,965,212 B2 * | 2/2015 | Morris et al. | 398/115 |
| 2006/0048385 A1 | 3/2006 | Cady et al. | |

* cited by examiner

Primary Examiner — Akm Enayet Ullah
Assistant Examiner — Michael Mooney

(57) ABSTRACT

An optical communications card is provided that has multiple parallel optical communications modules mounted on one or both sides of the card. A plurality of the optical communications cards can be edge-mounted and/or mid-plane mounted in an optical communications system such that the cards are electrically connected to a motherboard PCB. Because the spacing, or pitch, between the edge-mounted or mid-plane mounted cards can be very small, the cards can be mounted with very high density to provide the optical communications system with very high bandwidth.

16 Claims, 14 Drawing Sheets

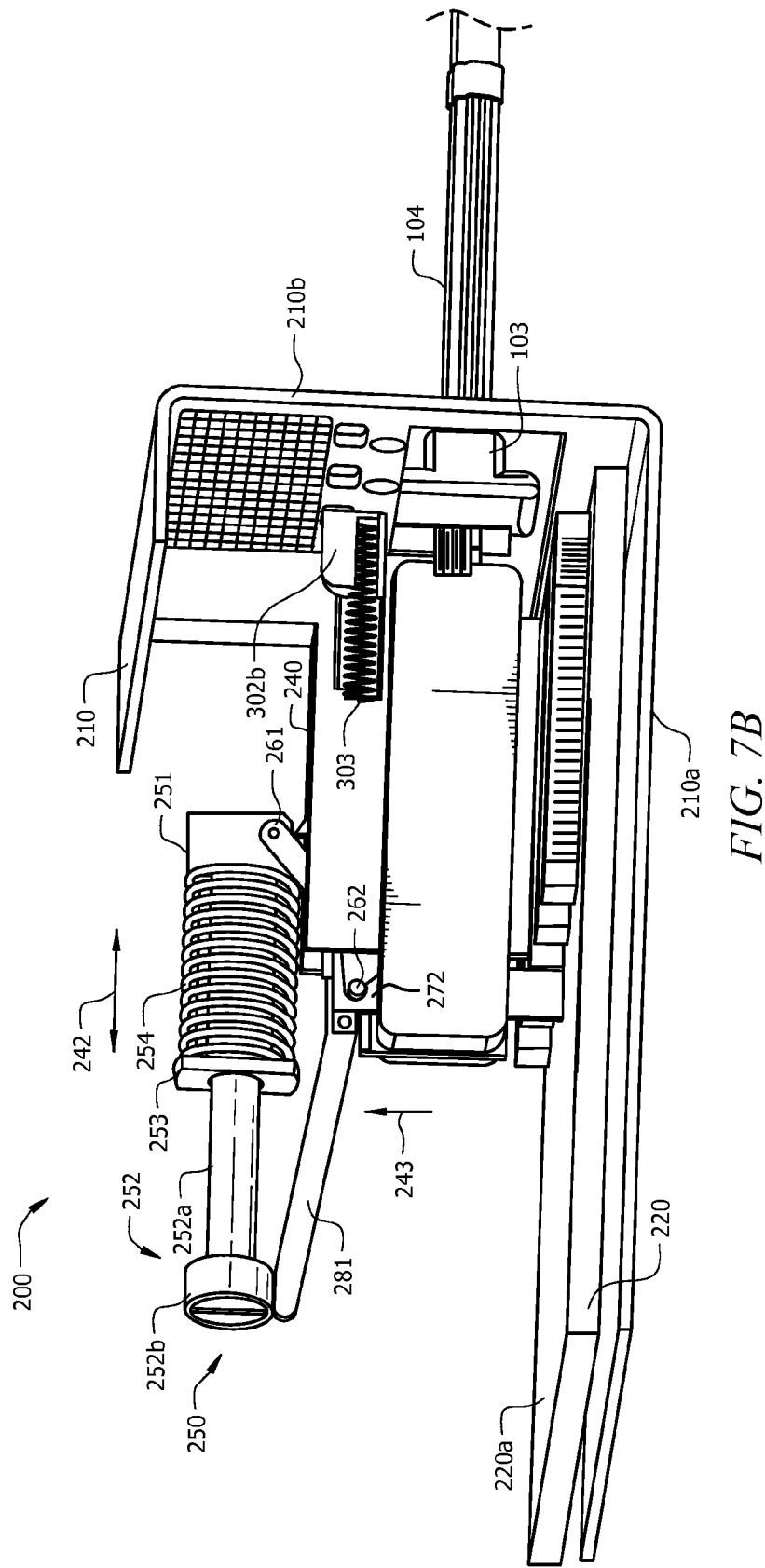

OPTICAL COMMUNICATIONS CARD, AN OPTICAL COMMUNICATIONS SYSTEM, AND METHODS AND APPARATUSES FOR PROVIDING HIGH-DENSITY MOUNTING OF OPTICAL COMMUNICATIONS CARDS

TECHNICAL FIELD OF THE INVENTION

The invention relates to optical communications systems. More particularly, the invention relates to an optical communications card and methods and systems for providing high-density mounting of optical communications cards.

BACKGROUND OF THE INVENTION

A parallel optical communications module is a module having multiple transmit (TX) channels, multiple receive (RX) channels, or both. A parallel optical transceiver module is an optical communications module that has multiple TX channels and multiple RX channels in TX and RX portions, respectively, of the transceiver module. The TX portion comprises components for transmitting data in the form of modulated optical signals over multiple optical waveguides, which are typically optical fibers. The TX portion includes a laser driver circuit and a plurality of laser diodes. The laser driver circuit outputs electrical signals to the laser diodes to modulate them. When the laser diodes are modulated, they output optical signals that have power levels corresponding to logic 1s and logic 0s. An optics system of the transceiver module focuses the optical signals produced by the laser diodes into the ends of respective transmit optical fibers held within a connector that mates with the transceiver module.

Typically, the TX portion also includes a plurality of monitor photodiodes that monitor the output power levels of the respective laser diodes and produce respective electrical feedback signals that are fed back to the transceiver controller. The transceiver controller processes the feedback signal to obtain respective average output power levels for the respective laser diodes. The transceiver controller outputs control signals to the laser driver circuit that cause it to adjust the modulation and/or bias current signals output to the respective laser diodes such that the average output power levels of the laser diodes are maintained at relatively constant levels.

The RX portion includes a plurality of receive photodiodes that receive incoming optical signals output from the ends of respective receive optical fibers held in the connector. The optics system of the transceiver module focuses the light that is output from the ends of the receive optical fibers onto the respective receive photodiodes. The receive photodiodes convert the incoming optical signals into electrical analog signals. An electrical detection circuit, such as a transimpedance amplifier (TIA), receives the electrical signals produced by the receive photodiodes and outputs corresponding amplified electrical signals, which are processed in the RX portion to recover the data.

There is an ever-increasing demand in the optical communications industry for parallel optical communications systems that are capable of simultaneously transmitting and receiving ever-increasing amounts of data. To accomplish this, it is known to combine multiple parallel optical transceiver modules of the type described above to produce a parallel optical communications system that has a higher bandwidth than the individual parallel optical transceiver modules. A variety of parallel optical transceiver modules are used in such systems for this purpose. For example, one known parallel optical transceiver module of the type described above includes a multi-fiber connector module known in the industry as the MTP® connector module. The MTP connector module plugs into a receptacle that is secured to a front panel of a rack of the optical communications system. The MTP connector module receives a duplex fiber ribbon cable having a total of 4, 8, 12, 24, or 48 optical fibers. Typically, half of the fibers of the ribbon cable are transmit fibers and the other half are receive fibers, although all of the fibers may be either transmit or receive fibers in cases where the module is being used as either a transmitter or a receiver, but not both. When the MTP connector module is plugged into the receptacle, electrical contacts of the connector module are electrically connected with electrical contacts of a printed circuit board (PCB) of the transceiver module. The laser diodes and the photodiodes are integrated circuits (ICs) that are mounted on the PCB. A laser driver IC and a transceiver controller IC are typically also mounted on the PCB, although the transceiver controller IC is sometimes mounted on a separate IC, known as the motherboard IC of the optical communications system.

It is known that multiple transceiver modules of the type that use the MTP connector module can be arranged in an array to provide an optical communications system that has an overall bandwidth that is generally equal to the sum of the bandwidths of the individual transceiver modules. One of the problems associated with such an array arises from the fact that the MTP connector modules are "edge-mounted," i.e., plugged into receptacles formed in the front panel of the rack of the optical communications system. Because the modules are edge-mounted, there must be sufficient space on the front panel to accommodate the receptacles and the respective MTP connector modules. Because space on the front panel is limited, the ability to increase bandwidth by increasing the size of the array is also limited.

An alternative to edge-mounting parallel optical transceiver modules is to mid-plane mount parallel optical transceiver modules. A mid-plane mounting configuration is one in which the modules are mounted in the plane of the motherboard PCB. One known parallel optical transceiver module that is mid-plane mounted is known in the industry as the Snap 12 transceiver module. The Snap 12 transceiver module comprises a 12-channel TX module and a 12-channel RX module. Each module has an array of 100 input/output (I/O) pins that plugs into a 100-pin ball grid array (BGA), known as a Meg-array. The Meg-array is, in turn, secured to the host PCB motherboard. The Snap 12 system is typically mounted in a box, which is connected to multiple electrical cables, which, in turn, are connected to multiple router ICs. In order to increase the total bandwidth of an optical communications system that uses multiple mid-plane mounted Snap 12 transceiver modules, multiple boxes may be used. The boxes are typically mounted in racks. The racks needed to accommodate a large number of boxes and the cables needed to interconnect the boxes to the router ICs consume a large amount of space and generate a large amount of heat. The space consumption and heat generation problems must be dealt with in order to make the system operate properly. Consequently, a system that is constructed of multiple boxes in order to achieve an increased bandwidth is generally very expensive.

Other mid-plane mounting solutions exist or have been proposed for mounting multiple parallel optical transceiver modules on a motherboard PCB. One of the problems associated with the existing or proposed mid-plane mounting solutions is that there are limitations on the mounting density of the modules on the motherboard PCB. Each module consumes spatial area, or footprint, on the surface of the motherboard PCB and the modules must be spaced apart from adjacent modules on the motherboard PCB by some minimum spacing, or pitch. Because there is a finite spatial surface area on the motherboard PCB for mounting the modules, the mounting density of the modules is limited, which limits the overall bandwidth of the system.

Accordingly, a need exists for an optical communications system having a mounting configuration in which parallel optical transceiver modules are capable of being mounted with very high density on the motherboard PCB. Increasing the mounting density of the modules increases the amount of data that can be simultaneously transmitted from and received in the optical communications system.

SUMMARY OF THE INVENTION

The invention is directed to an optical communications system and method. The system comprises a motherboard circuit board (CB), a first edge card connector and a first optical communications card. The first edge card connector is mounted on the first surface of the motherboard CB. The first edge card connector has at least first and second side walls that face one another and that are separated from one another by an air gap that forms a slot in the edge card connector. The edge card connector has first and second sets of electrical contacts. Electrical contacts of the first set of electrical contacts are in contact with electrical contacts of the motherboard CB such that the first edge card connector and the motherboard CB are electrically interconnected with one another. The second set of electrical contacts of the edge card connector is disposed in the slot. The first optical communications card comprises a CB having at least a first parallel optical communications module (POCM) mounted on a first surface thereof and electrically interconnected with the CB of the card. At least a first portion of the CB of the optical communications card is disposed within the slot of the first edge card connector. The first portion of the CB has electrical contacts disposed thereon that are in contact with the second set of electrical contacts of the first edge card connector such that the first optical communications card and the first edge card connector are electrically interconnected with one another.

The method comprises mounting at least a first edge card connector on a first surface of a motherboard CB, and inserting at least a first portion of a first optical communications card into a slot of the first edge card connector. The first edge card connector has at least first and second side walls that face one another and that are separated from one another by an air gap that forms the slot in the edge card connector. The edge card connector has first and second sets of electrical contacts. The first set of electrical contacts is in contact with electrical contacts of the motherboard CB such that the first edge card connector and the motherboard CB are electrically interconnected with one another. The second set of electrical contacts is disposed in the slot. The first optical communications card comprises a CB having at least a first POCM mounted on a first surface thereof and electrically interconnected with the CB of the card. The first portion of the CB has electrical contacts disposed thereon that are in contact with the second set of electrical contacts of the first edge card connector such that the first optical communications card and the first edge card connector are electrically interconnected with one another.

These and other features and advantages of the invention will become apparent from the following description, drawings and claims.

BRIEF DESCRIPTION OF THE DRAWINGS

FIG. 7B illustrates a rear perspective view of the optical communications system shown in FIG. 7A just prior to the card being pushed downward to engage the edge card connector.

DETAILED DESCRIPTION OF AN ILLUSTRATIVE EMBODIMENT

Figure 1A:
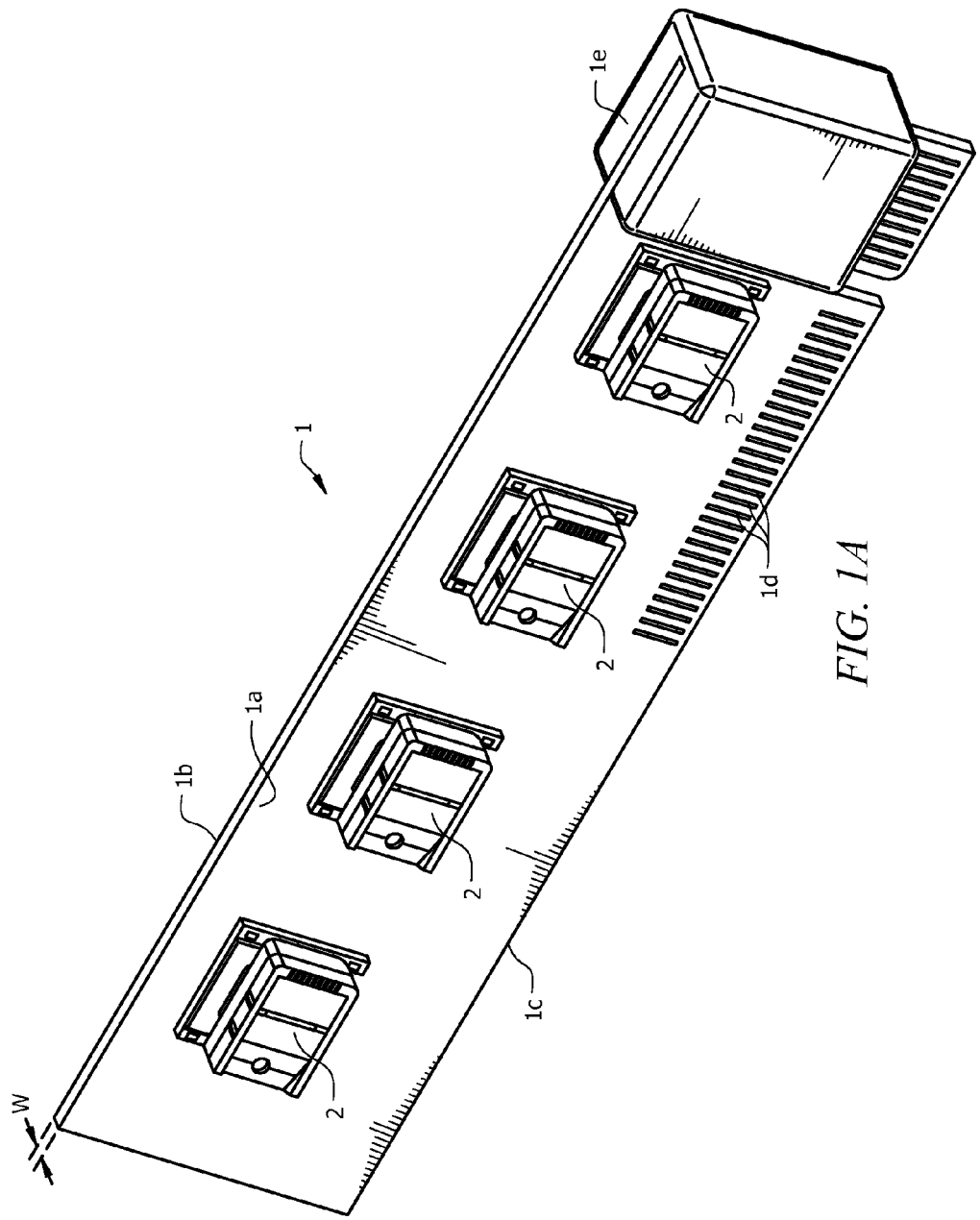
FIGS. 1A and 1B illustrates side and top perspective views, respectively, of the optical communications card in accordance with an illustrative embodiment.

In accordance with the invention, an optical communications card is provided that has multiple parallel optical communications modules mounted on one or both sides of the card. A plurality of the optical communications cards can be edge-mounted and/or mid-plane mounted in an optical communications system such that the cards are electrically connected to a motherboard PCB. Because the spacing between the edge-mounted or mid-plane mounted cards, also referred to herein as the pitch, can be very small, the cards can be mounted with very high density to provide the optical communications system with very high bandwidth. Illustrative, or exemplary, embodiments of the optical communications card and various edge-mounted or mid-plane mounted configurations will be described below with reference to FIGS. 1A-10, in which like reference numerals represent like elements, components or features.

Figure 1B:
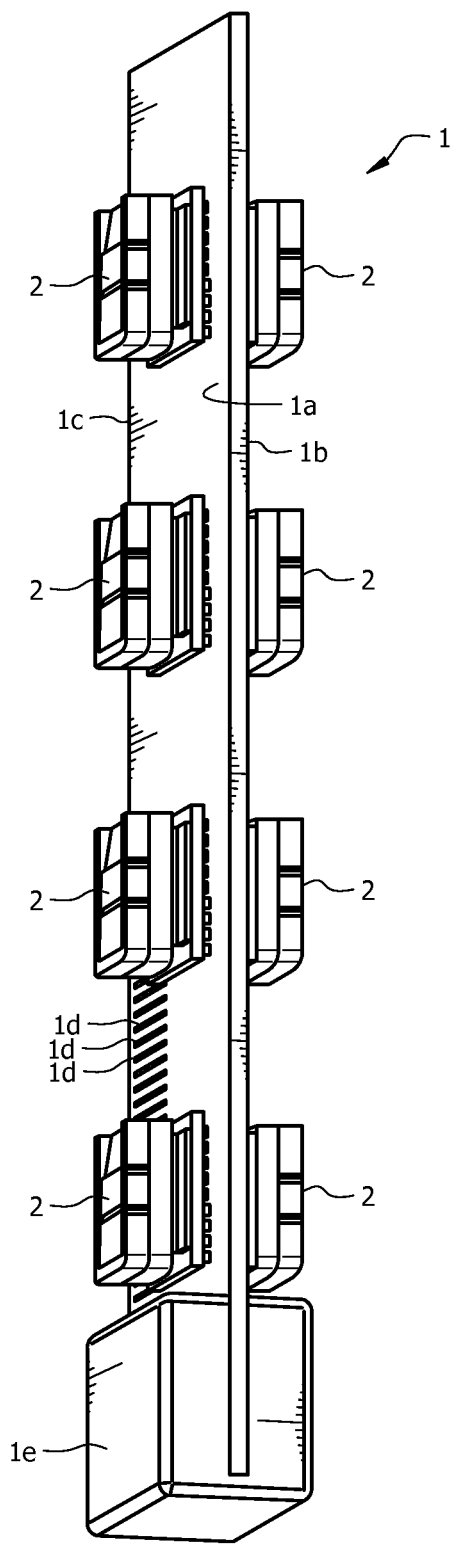

FIGS. 1A and 1B illustrates side and top perspective views, respectively, of the optical communications card 1 in accordance with an illustrative embodiment. In accordance with this illustrative embodiment, the card 1 is a PCB having four parallel optical transceiver modules 2 mounted on each of the sides 1a and 1b of the card 1. Each of the parallel optical transceiver modules 2 has six transmit channels and six receive channels. It should be noted, however, that the invention is not limited with respect to the number of parallel optical transceiver modules that are mounted on one or both sides of the card 1 or with respect to the number of transmit and/or receive channels that each parallel optical transceiver module has. Each of the transceiver modules 2 has electrical contacts (not shown) disposed on a lower surface thereof that are electrically coupled to respective electrical contacts (not shown) disposed on the sides 1a and 1b of the card 1. Electrically-conductive contacts 1d are disposed on the lower edge 1c of the card 1 on both sides 1a and 1b of the card 1 for contacting respective electrically-conductive contacts of an edge card connector (not shown). Through these electrically-conductive contacts, the electrical circuitries of each of the parallel optical transceiver modules 2 are electrically connected to the electrical circuitries of the PCBs of the cards 1, and the electrical circuitries of the PCBs of the cards 1 are electrically connected to electrical circuitries of the motherboard PCB (not shown). The block 1e secured to the proximal end of the card 1 is intended to represent a strain relief device for providing the card 1 with strain relief from external forces.

Figure 2:
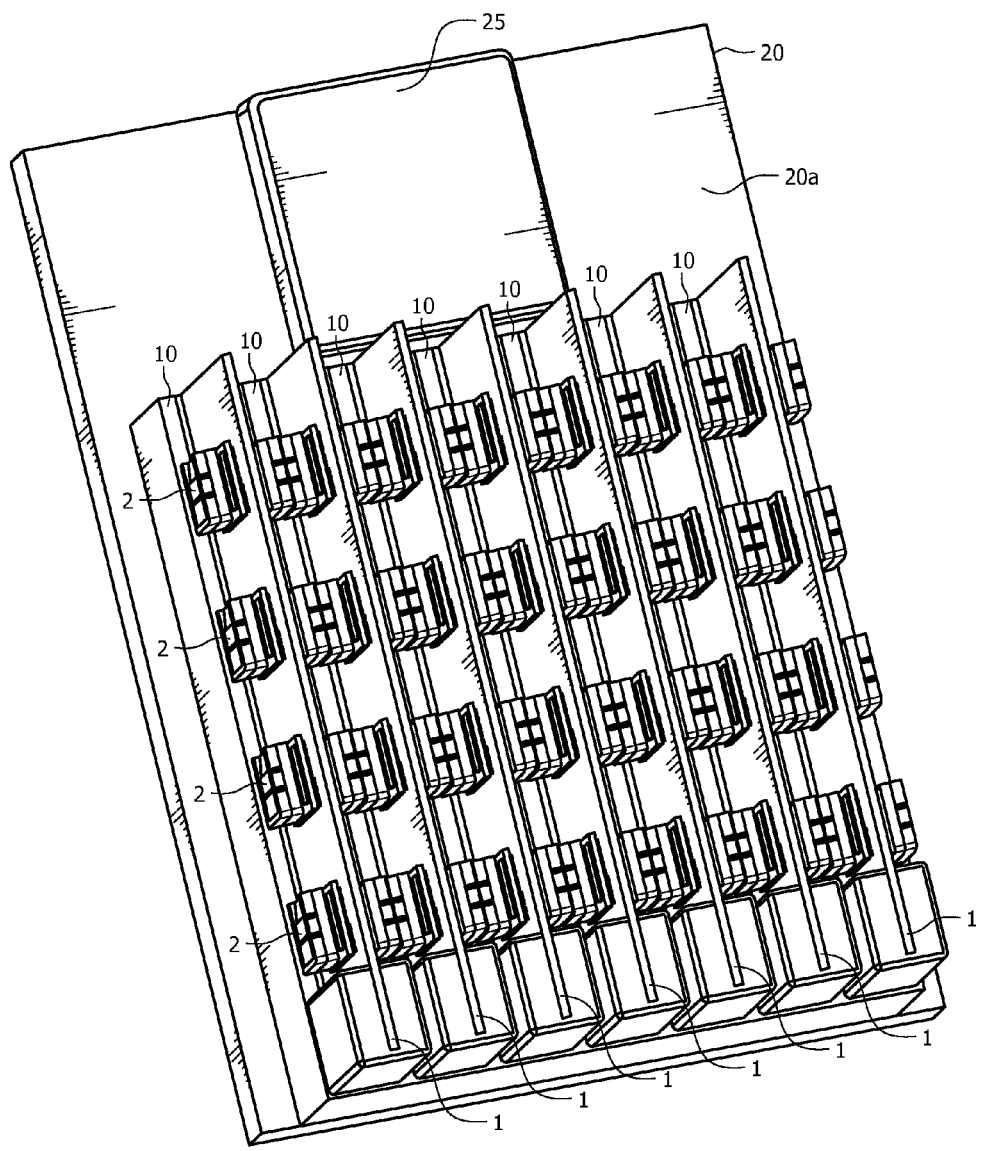
FIG. 2 illustrates a top perspective view of a plurality of the optical communications cards shown in FIGS. 1A and 1B mounted in respective edge card connectors, which, in turn, are mounted on an upper surface of a motherboard PCB.
Figure 3:
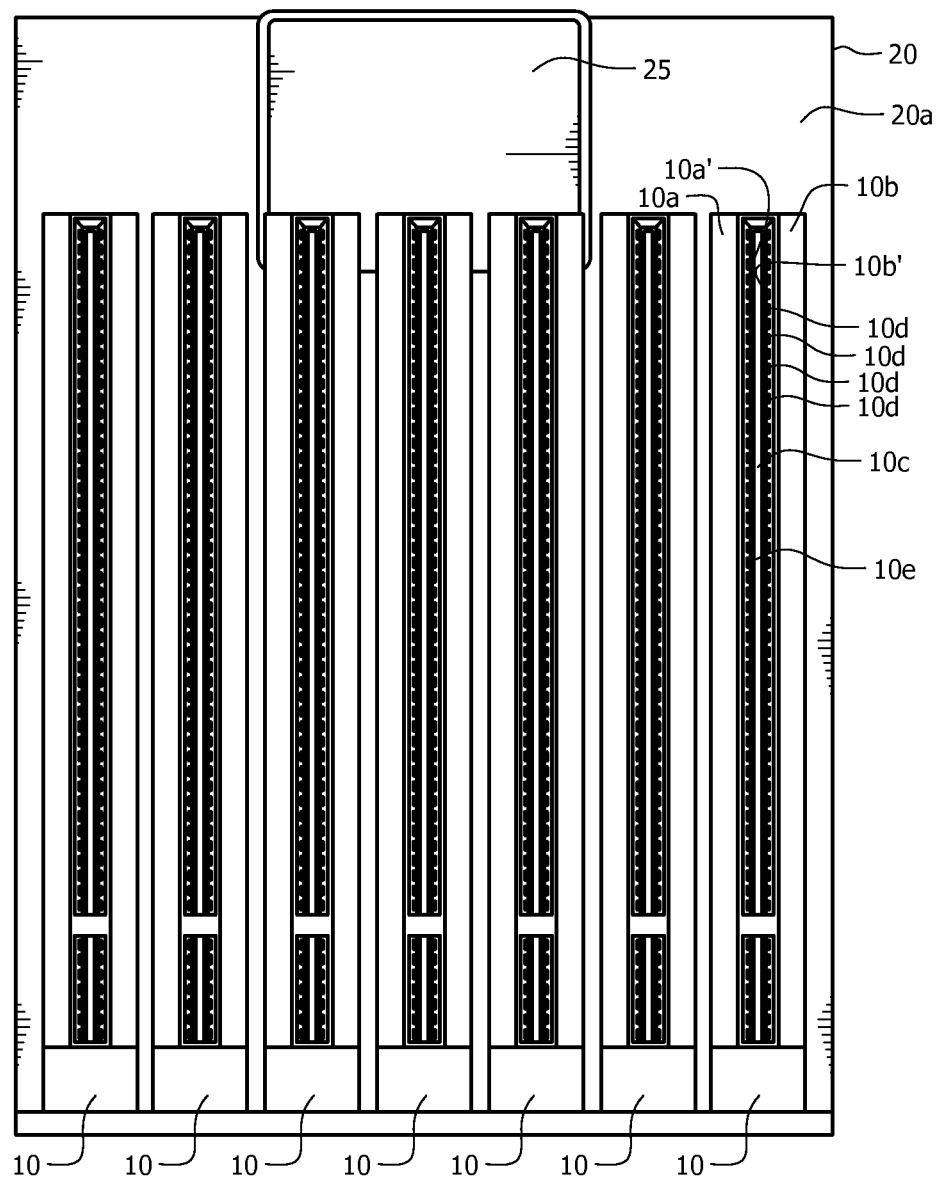
FIG. 3 illustrates a top plan view of the edge card connectors shown in FIG. 2 with the cards removed.

FIG. 2 illustrates a top perspective view of a plurality of the optical communications cards 1 shown in FIGS. 1A and 1B mounted in respective edge card connectors 10, which, in turn, are mounted on an upper surface 20a of a motherboard PCB 20. FIG. 3 illustrates a top plan view of the edge card connectors 10 shown in FIG. 2 with the cards 1 removed. In FIG. 2, the cards 1 are edge-mounted in a front panel (not shown) of an optical communications system housing (not shown). The housing and the front panel are not shown in FIG. 2 so that the cards 1 and the respective edge card connectors 10 can be easily seen. Each of the edge card connectors 10 has two side walls 10a and 10b, a bottom wall 10c, and a plurality of electrically-conductive contacts 10d (FIG. 3). The side walls 10a and 10b are separated from one another by an air gap, or slot, 10e. The electrically-conductive contacts 10d of each connector 10 are disposed on a lower surface 10c' of the bottom wall 10c for electrically coupling each connector 10 to electrical circuitry of the motherboard PCB 20. The slot 10e is sized to be approximately equal to, but slightly greater than, the width, W, of the lower edge 1c of the card 1.

The strain relief device 1e also enables a user to grip the cards 1 in order to slide the cards 1 into the respective slots 10e of the respective edge card connectors 10. The edge card connectors 10 may be known edge card connectors, such as, for example, peripheral component interface express (PCIe) edge card connectors, or they may be edge card connectors that are specifically designed for this purpose using existing edge card connector manufacturing processes. PCIe edge card connectors have 150 electrically-conductive contacts for data signals and 20 electrically-conductive contacts for control signals, which is sufficient for communicating with the parallel optical transceiver modules 2 mounted on the card 1.

In the edge-mounted configuration shown in FIG. 2, the cards 1 are engaged with the respective connectors 10 by sliding the cards 1 through respective receptacles (not shown) disposed in a front panel (not shown) of an optical communications system housing (not shown) in the direction indicated by arrow 22 until the lower edges 1c of the cards 1 are fully engaged with the slots 10e. When the cards 1 are fully engaged with the respective connectors 10, the electrically-conductive contacts 1d disposed on the lower edges 1c of the cards 1 are in contact with respective electrically-conductive contacts 10d disposed on the inner surfaces 10a' and 10b' of the side walls 10a and 10b of the edge card connectors 10. An optional hub IC 25 is shown mounted on the upper surface 20a of the motherboard PCB 20 for communicating with the parallel optical transceiver modules 2 via the electrical circuitry (not shown) of the motherboard PCB 20. A variety of edge-mounting configurations may be used to enable edge-mounting of the cards 1 and a front panel, a few of which will be described below in more detail with reference to a few illustrative embodiments.

Figure 4:
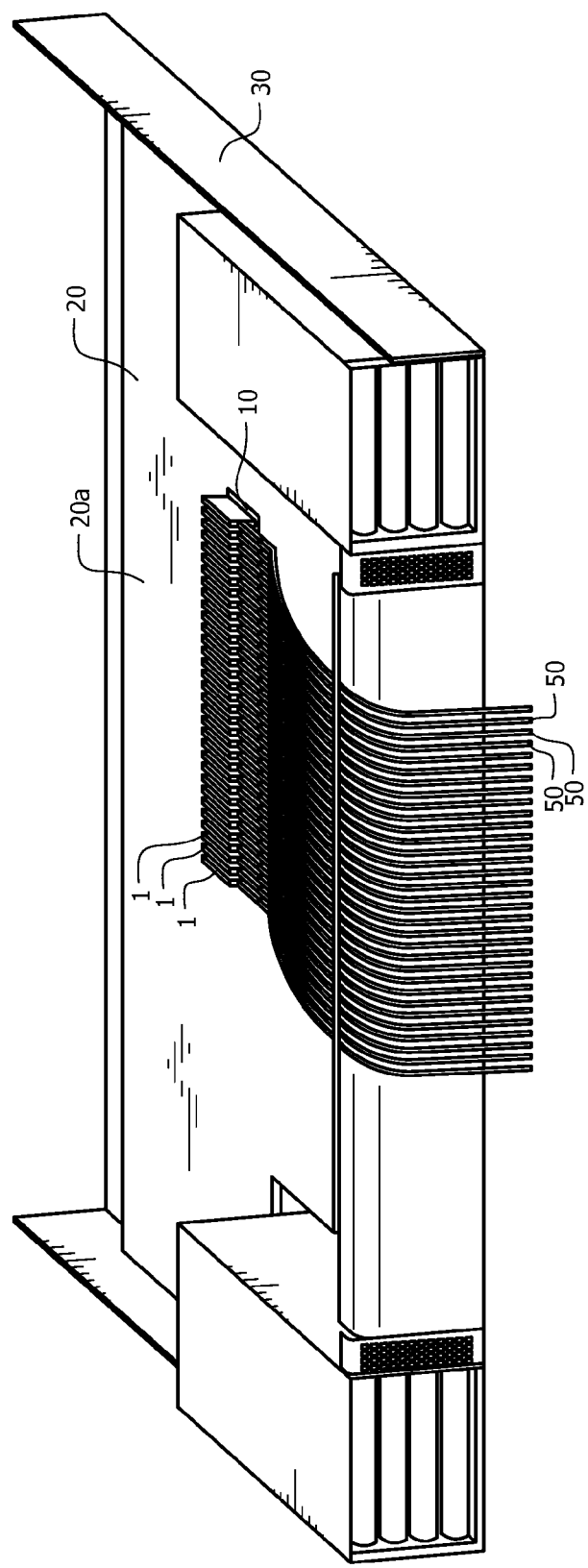
FIG. 4 illustrates a top perspective view of a lower portion of an optical communications system housing having a motherboard PCB mounted therein on which a plurality of the edge card connectors are mid-plane mounted, each of which has a respective one of the optical communications cards engaged therewith.

FIG. 4 illustrates a top perspective view of a lower portion of an optical communications system housing 30 having a motherboard PCB 20 mounted therein on which a plurality of the edge card connectors 10 are mid-plane mounted, each of which has a respective one of the optical communications cards 1 engaged therewith. Each of the cards 1 is mechanically and optically coupled to an optical fiber cable 50. Each optical fiber cable 50 has as many optical fibers as there are transmit and receive channels and each of the parallel optical transceiver modules 2. For example, in the illustrative embodiment described above with reference to FIGS. 1-3, each card has eight modules 2 mounted on both sides of card 1 and each module has twelve transmit and/or receive channels. In that example, therefore, each optical fiber cable 50 contains ninety-six optical fibers, which may be bundled as, for example, eight 1×12 optical fiber ribbon cables. In the mid-plane mounting configuration shown in FIG. 4, the cards 1 are typically inserted into the respective slots 10e of the respective connectors 10 by hand, although this process may instead be performed automatically.

Figure 5A:
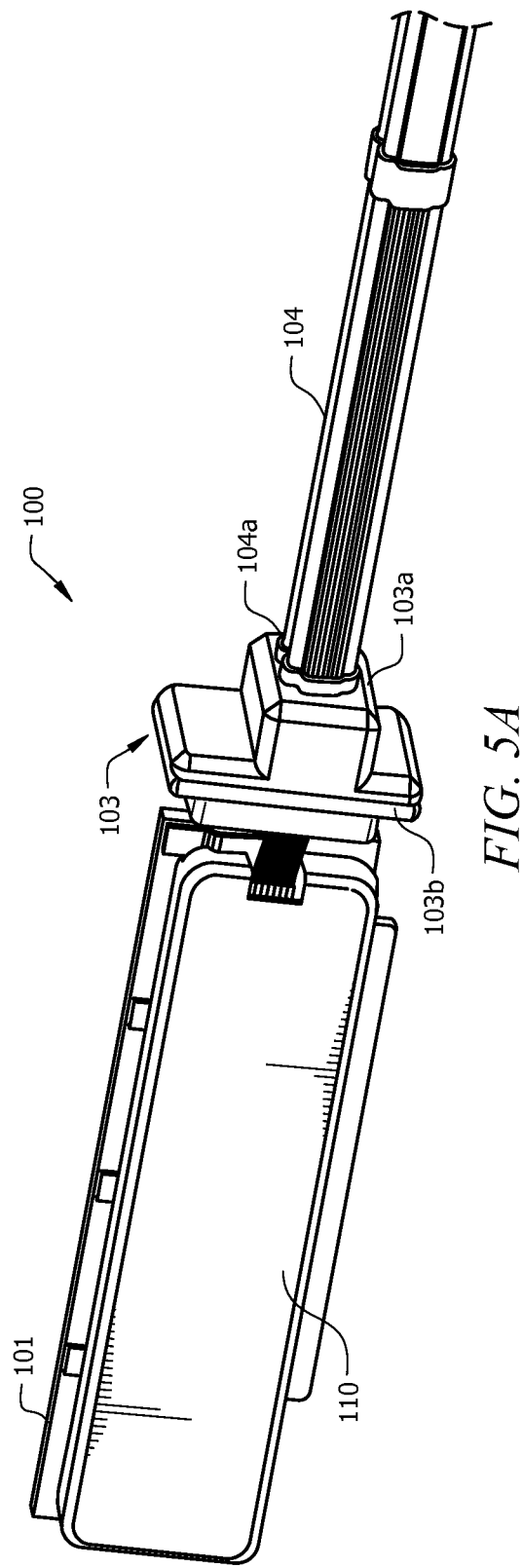
FIGS. 5A and 5B illustrate side and front perspective views of the optical communications card in accordance with another illustrative embodiment in which each side of the card has a cover secured thereto that covers and protects the parallel optical transceiver modules mounted on the sides of the card.
Figure 5B:
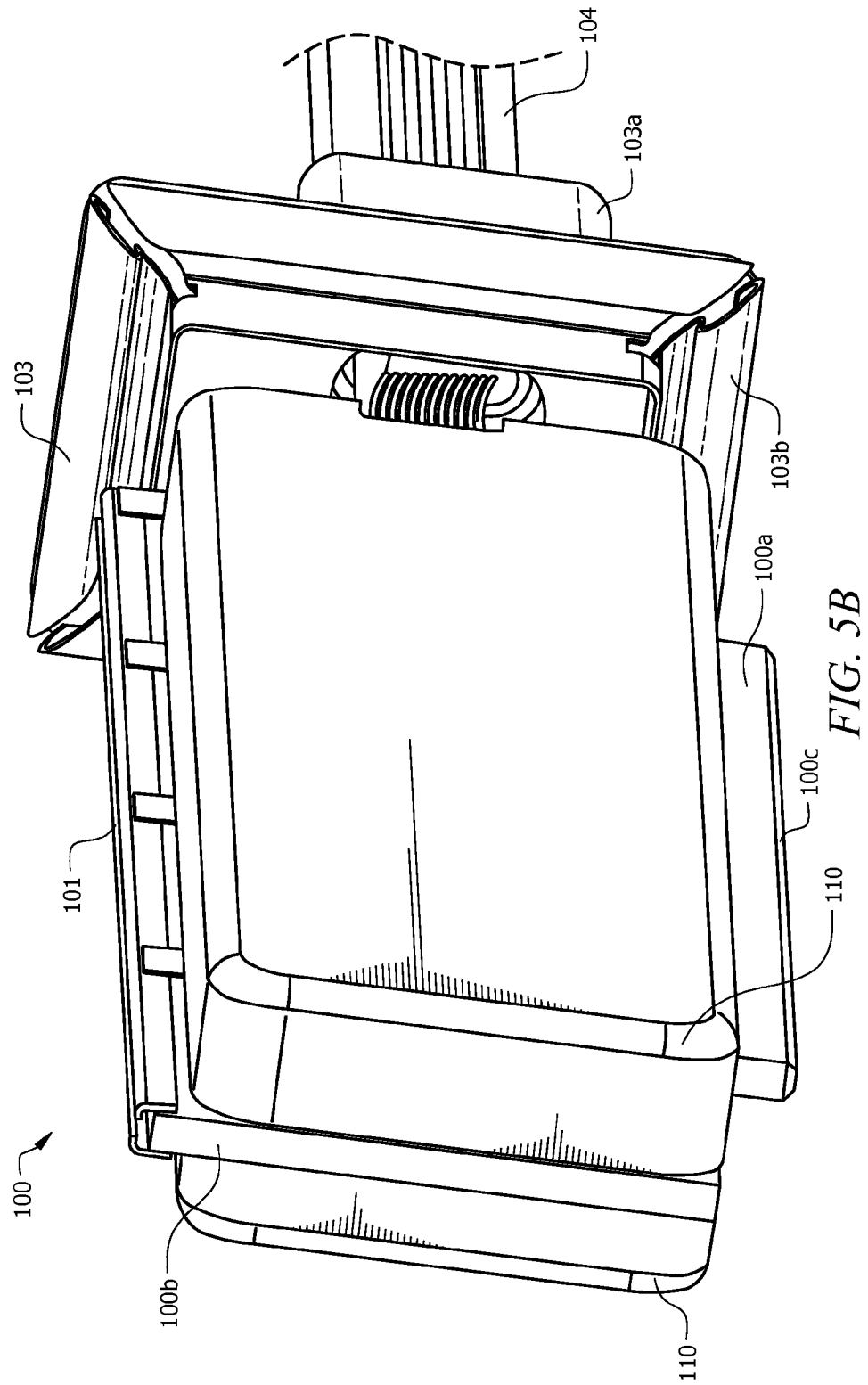
Figure 6:
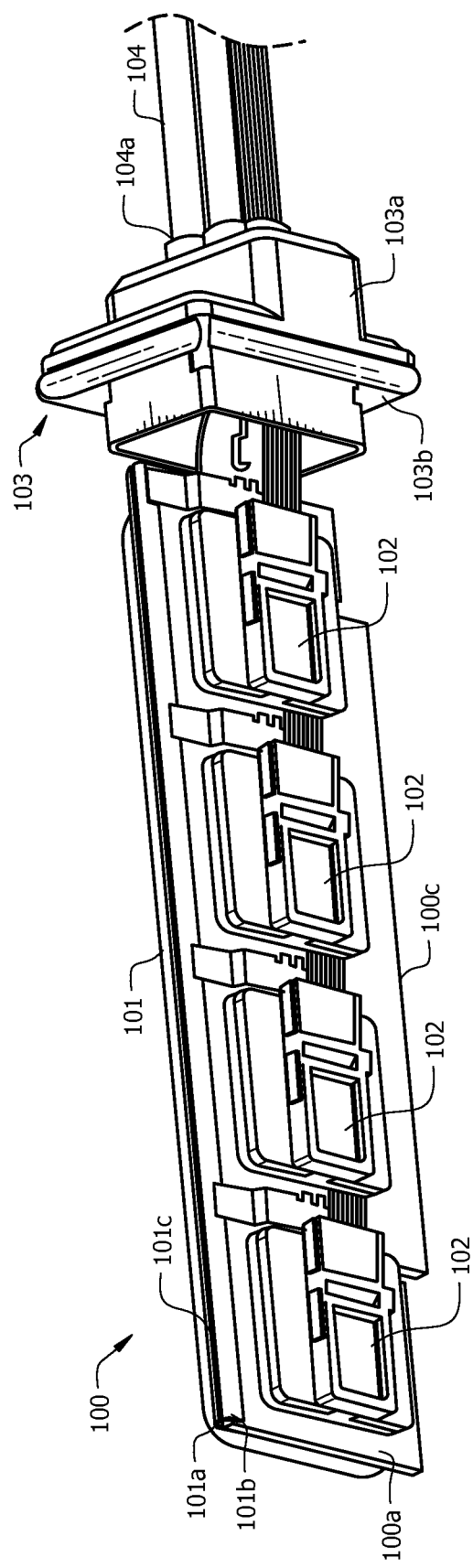
FIG. 6 illustrates a side perspective view of the optical communications card shown in FIGS. 5A and 5B with one of the covers removed to reveal the parallel optical transceiver modules that are mounted on one side of the card.

FIGS. 5A and 5B illustrate side and front perspective views of the optical communications card 100 in accordance with another illustrative embodiment in which each side of the card 100 has a cover 110 secured thereto that covers and protects the parallel optical transceiver modules (not shown) mounted on the sides of the card 100. FIG. 6 illustrates a side perspective view of the optical communications card 100 shown in FIGS. 5A and 5B with one of the covers 110 removed to reveal the parallel optical transceiver modules 102 that are mounted on one side 100a of the card 100. The card 100 is very similar to the card 1 shown in FIGS. 1-4 except that they have slightly different strain relief devices and the parallel optical transceiver modules that are mounted on the cards 1 and 100 are slightly different. The strain relief device 103 of the card 100 includes a metal outer portion 103a that connects to an end 104a of an optical fiber cable 104 and a metal inner portion 103b that abuts a front panel when the card 100 is engaged with an edge card connector (not shown). Because the strain relief device 103 is made of metal and abuts the front panel, the strain relief device 103 performs electromagnetic interference (EMI) shielding. The card 100 has a hanger 101 that is secured to the upper edge 100b of the card 100.

Figure 7A:
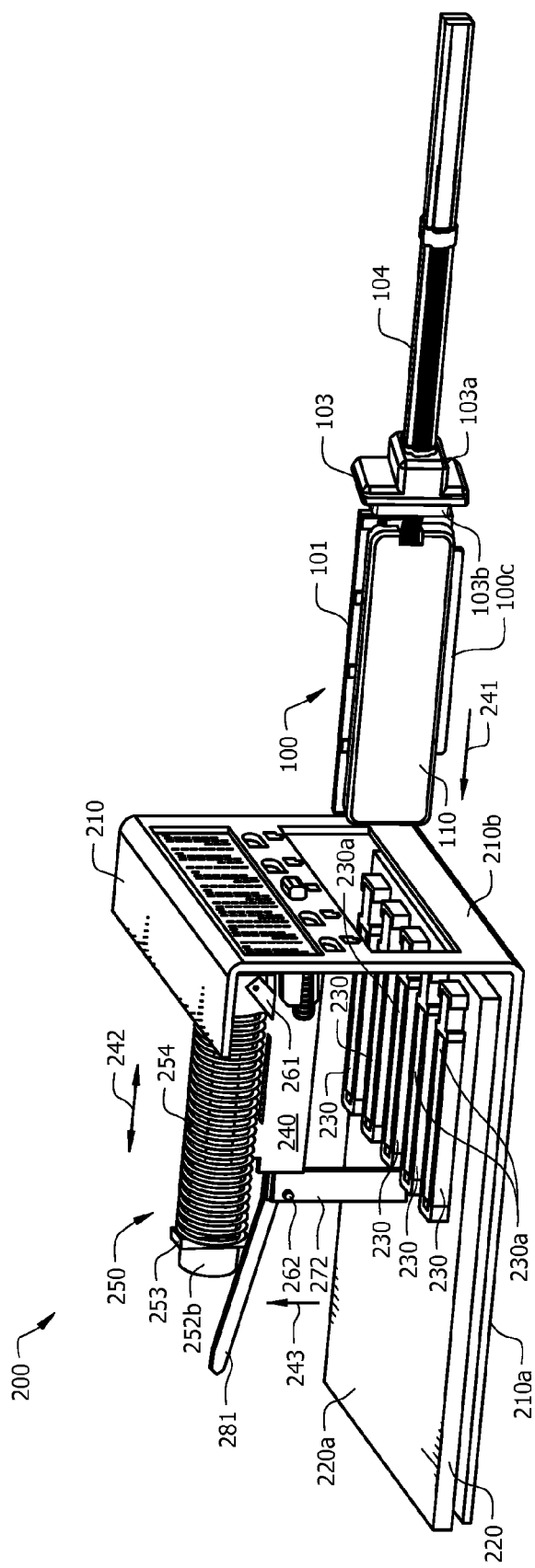
FIG. 7A illustrates a front perspective view of an optical communications system that includes a housing portion, a motherboard PCB mounted on a bottom panel of the housing portion, a plurality of edge card connectors mounted on an upper surface of the motherboard PCB, a front panel of the housing portion having an opening formed therein through which the cards shown in FIGS. 5A-6 are inserted, and one of the cards positioned in front of the front panel prior to being mounted in a respective one of the edge card connectors.
Figure 7C:
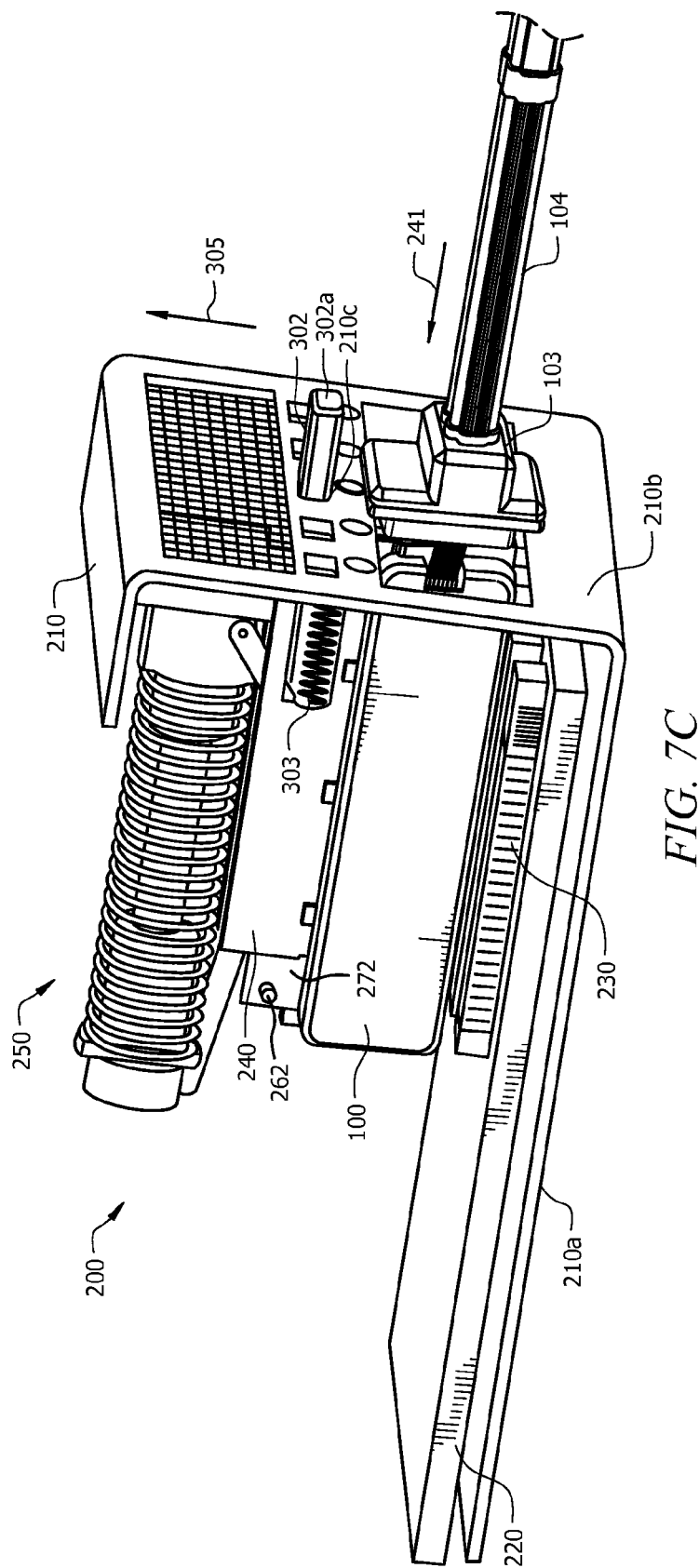
FIG. 7C illustrates a side perspective view of the optical communications system shown in FIG. 7A with the card fully engaged with a respective one of the edge card connectors.

FIG. 7A illustrates a front perspective view of an optical communications system 200 in accordance with an illustrative embodiment. The optical communications system 200 includes a housing portion 210, a motherboard PCB 220 mounted on a bottom panel 210a of the housing portion 210, a plurality of edge card connectors 230 mounted on an upper surface 220a of the motherboard PCB 220, a front panel 210b of the housing portion 210 having an opening formed therein through which the cards 100 shown in FIGS. 5A-6 are inserted for engagement with the connectors 230, and one of the cards 100 positioned in front of the front panel 210b prior to being mounted in a respective one of the edge card connectors 230. FIG. 7B illustrates a rear perspective view of the optical communications system 200 shown in FIG. 7A just prior to the card 100 being pushed downward to engage the edge card connector 230. FIG. 7C illustrates a side perspective view of the optical communications system 200 shown in FIG. 7A with the card 100 fully engaged with a respective one of the edge card connectors 230.

The manner in which one of the optical communications cards 100 is engaged with a respective one of the edge card connectors 230 will now be described with reference to FIGS. 6-7C. With respect to FIG. 6, the hanger 101 that is secured to the upper edge of the card 100 comprises first and second rails 101a and 101b that are separated from each other by an air gap, or slot, 101c. The first and second rails 101a and 101b engage a track (not shown) formed in a guide mechanism 240 (FIGS. 7A-7C) when the card 100 is inserted through the front panel 210b in the direction indicated by arrow 241 (FIG. 7A). The hanger 101 is made of a thermally conductive material, such as, for example, metal, to allow heat generated by the modules 102 to be transferred from the hanger into the guide mechanism 240, where the heat spreads out and is dissipated. The guide mechanism 240 has a spring-loaded actuator 250 movably mounted within it that is constrained to travel in the directions indicated by arrow 242, i.e., parallel to the hanger 101.

As can better be seen in FIG. 7B, the spring-loaded actuator 250 includes a base 251, a screw 252, a slider 253, and a first compression spring 254. A proximal end of the spring 254 is fixedly secured to the base 251. A proximal end of the screw 252 is also fixedly secured to the base 251. A shaft 252a of the screw 252 is slidable in the directions indicated by arrow 242 through an opening formed in the slider 253.

A release trigger 261 is rotationally coupled on its proximal end to the base 251. The release trigger 261 is in pivotal contact on its distal end to pins 262 disposed on opposite sides of a support 272. A down trigger 281 has a proximal end that is disposed in free space to come into contact with a head 252b of the screw 252 when the spring-loaded actuator 250 is in its rearward position shown in FIG. 7B. A distal end of the down trigger 281 is mechanically coupled to the release trigger 261. A distal end of the release trigger 261 is engaged with fixed pins 262.

When the card 100 is inserted through the front panel 210b in the direction indicated by arrow 241 such that the hanger 101 engages the track of the guide mechanism 240, the force exerted on the card 100 in the direction indicated by arrow 241 pushes the spring-loaded actuator 250 in the direction indicated by arrow 241 until the spring-loaded actuator 250 is in its rearward position, as shown in FIG. 7B. As the spring-loaded actuator 250 travels in the direction indicated by arrow 241, the distance between the base 251 and the slider 253 decreases, thereby causing the compression spring 254 to become compressed. As the spring-loaded actuator 250 travels in the direction indicated by arrow 241, the shaft 252a of the screw 252 slides through the opening formed in the slider 253 to extend in the direction indicated by arrow 241. When the spring-loaded actuator 250 arrives at its rearward position, the head 252b of the screw 252 comes into contact with the proximal end of the down trigger 281.

The down trigger 281 is essentially a lever such that the force applied by the head 252b of the screw 252 on the proximal end of the down trigger 281 causes the distal end of the down trigger 281 to move in the direction indicated by arrow 243. When the distal end of the down trigger 281 moves in the direction indicated by arrow 243, the down trigger 281 triggers the release trigger 261 by disengaging the distal end of the release trigger 261 from the pins 262. When this happens, the force stored in the compressed spring 254 is released, which forces the spring-loaded actuator 250 to move from its rearward position shown in FIG. 7B toward its forward position shown in FIG. 7C. As the spring-loaded actuator 252 moves from its rearward position shown in FIG. 7B to its forward position shown in FIG. 7C, the spring-loaded actuator 252 actuates a cam (not shown) of the guide mechanism 240 that pushes the card 100 down to cause the lower edge 100c of the card 100 to fully engage the slot 230a of the edge card connector 230.

The optical communications system 200 also includes a spring-loaded pushbutton mechanism comprising a pushbutton 302 and a compression spring 303. A first portion 302a of the pushbutton 302 extends through an opening 210c formed in the front panel 210b and a second portion 302b of the pushbutton 302 extends behind the front panel 210b. The compression spring 303 has a proximal end that is mechanically coupled with the second portion 302b of the pushbutton 302 and a distal end that abuts the spring-loaded actuator 250. When the card 100 is engaged with the slot 230a of the edge card connector 230, as depicted in FIG. 7C, the pushbutton 302 is fully extended in front of the front panel 210b and the compression spring 303 is in its compressed state. If the pushbutton 302 is pressed in the direction indicated by arrow 241 until the first portion 302a of the pushbutton 302 is almost flush with the front panel 210b, the distal end of the compression spring 303 will exert a force on the spring-loaded actuator 250 that forces it in the rearward direction. When the spring-loaded actuator 250 is forced in the rearward direction in this manner, a cam (not shown) will exert a force on the card 100 in the direction indicated by arrow 305 double cause the card 100 to disengage from the slot 230a. The user can then extract the card 100 from the system 200 by exerting a force on the strain relief device 103 in a direction that is opposite to the direction indicated by arrow 241.

Figure 8A:
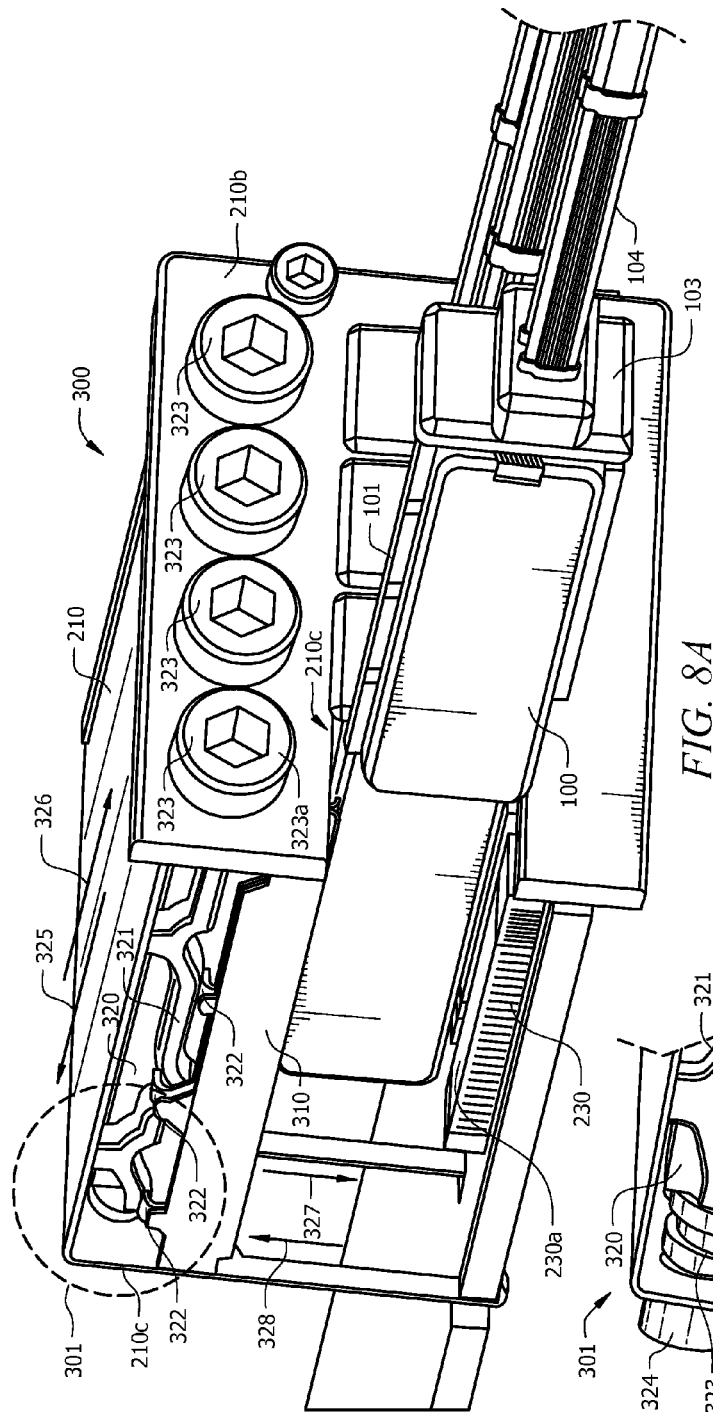
FIG. 8A illustrates a perspective view of an optical communications system in accordance with another illustrative embodiment in which a screw-turn actuator is utilized to actuate a cam mechanism that lowers the card into and lifts the card from the slot when the screw is turned on different directions.
Figure 8B:
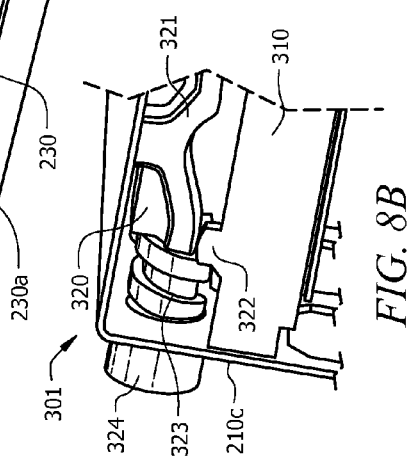
FIG. 8B illustrates an enlarged view of a portion of the perspective view shown in FIG. 8A.

A number of configurations may be used to automatically engage or disengage the cards from the respective slots of the respective edge card connectors when a user initiates insertion or extraction action, respectively. The system configuration described with reference to FIGS. 7A-7C is merely one example of a suitable configuration for this purpose. Other suitable configurations will now be described with reference to FIGS. 8A-11. FIG. 8A illustrates a perspective view of an optical communications system 300 in accordance with another illustrative embodiment in which a screw-turn actuator rather than a spring-loaded actuator is utilized to actuate a cam mechanism that lowers the card 100 into the slot 230a when the screw is turned on one direction and that lifts the card 100 out of the slot 230a when the screw is turned in the opposite direction. FIG. 8B illustrates an enlarged view of a portion 301 of the perspective view shown in FIG. 8A.

The optical communications system 300 includes a guide mechanism 310 having a track (not shown) that engages the hanger 101 that is secured to the upper edge of the card 100 when the user inserts the card 100 through the respective opening formed in the front panel 210b. The optical communications system 300 includes a screw-turn actuator 320 having a cam 321 formed on it that engages a cam follower 322 formed on the guide mechanism 310. The screw-turn actuator 320 includes an Acme screw 323 fixed to one end of the cam 321 and in abutment with the front panel 210b and includes an Acme threaded nut 324 that is fixed to a vertical wall 210c of the housing portion 210 and threadingly coupled to the end of a threaded shaft (not shown) of the Acme screw 323.

The cam 321 has a cam surface 321a formed in it that limits the direction of travel of the cam follower 322. When the Acme screw 323 is turned in the clockwise direction, the cam 321 moves in the direction indicated by arrow 325. When the Acme screw 323 is turned in the counter clockwise direction, the cam 321 moves in the direction indicated by arrow 326. When the cam 321 moves in the direction indicated by arrow 325, the direction of travel of the cam follower 321 causes the guide mechanism 310 to be lowered, i.e., to move in the direction indicated by arrow 327. When the cam 321 moves in the direction indicated by arrow 326, the direction of travel of the cam follower 321 causes the guide mechanism 310 to be raised, i.e., to move in the direction indicated by arrow 328.

After the card 100 has been fully inserted through the front panel 210b such that the strain relief device 103 is in abutment with the front panel 210b, the person installing the card 100 turns the head 323a of the Acme screw 323 by two turns in the counter clockwise direction to cause the card 100 to be lowered into the slot 230a. To remove the card 100 from the slot 230a, the person removing the card 100 turns the Acme screw 323 by two turns in the clockwise direction to cause the card 100 to be raised out of the slot 230a. The person can then remove the card 100 from the housing portion 210 by sliding the card in the direction away, and generally perpendicular to, from the front panel 210b. Of course, two turns is not the only thread pitch that may be used for this purpose.

Figure 9:
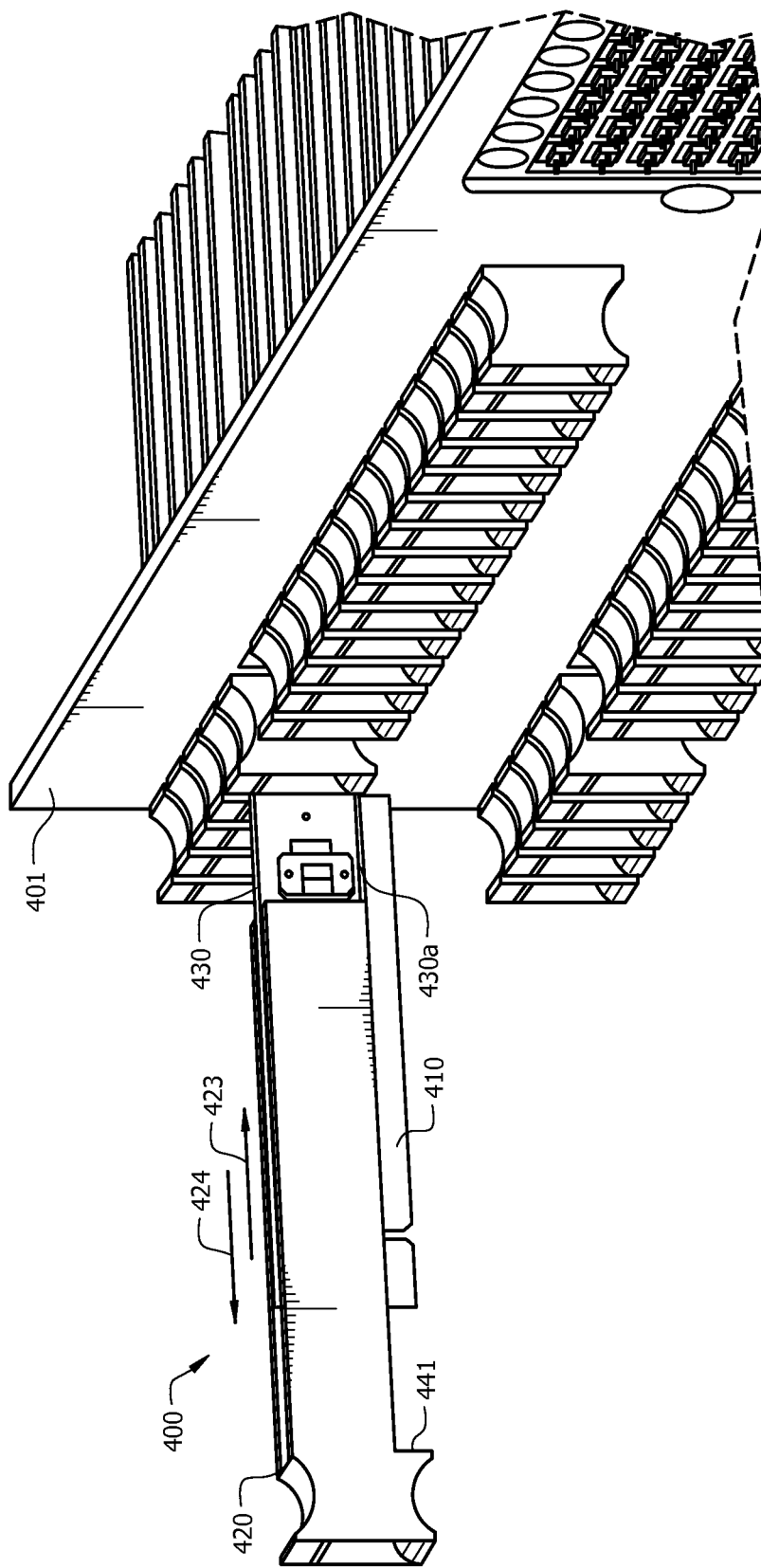
FIG. 9 illustrates a perspective view of the optical communications system in accordance with another illustrative embodiment in which a different type of cam/cam follower configuration is utilized to lower an optical communications card into the slot of the edge card connector and to lift the card out of the slot.
Figure 10:
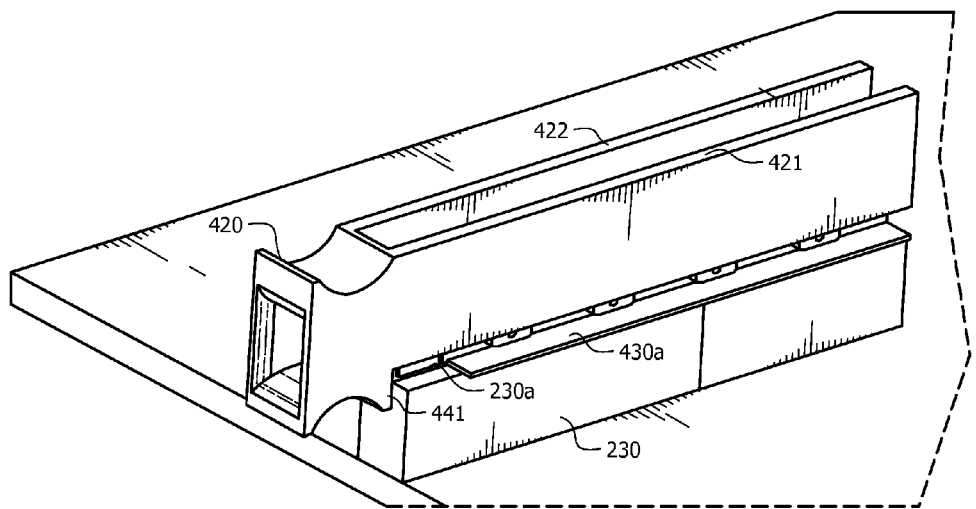
FIG. 10 illustrates a perspective view of one of the sliders, one of the cards, and one of the edge card connectors shown in FIG. 9 with the front panel shown in FIG. 9 removed.
Figure 11:
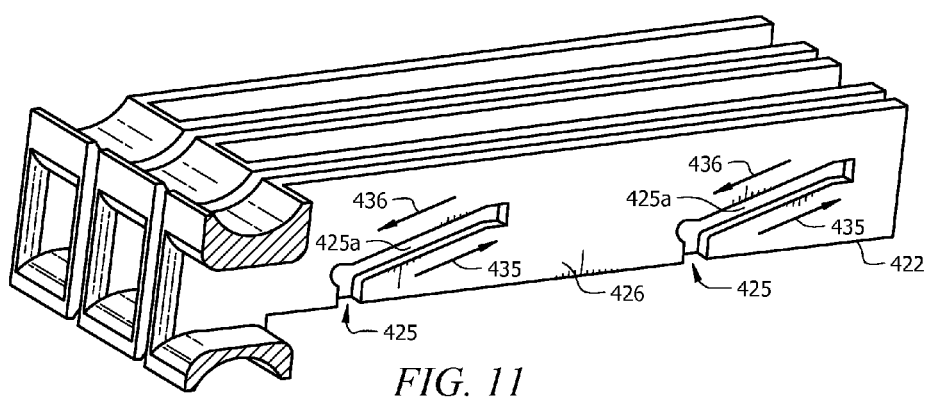
FIG. 11 illustrates a perspective view of one of the sliders shown in FIG. 9 with one of the side walls removed to reveal the cams formed in the interior surface of the side wall of the slider.

FIG. 9 illustrates a perspective view of the optical communications system 400 in accordance with another illustrative embodiment in which a different type of cam/cam follower configuration is utilized to lower an optical communications card 410 into the slot 230a of the edge card connector 230 and to lift the card 410 out of the slot 230a. The card 410 is mounted within a slider 420 having cams (not shown) formed in interior surfaces of its side walls 421 and 422 (FIG. 10). The cams engage respective cam followers (not shown) disposed on a lead frame 430 of the card 410 such that cam action between the cams and the respective cam followers occurs upon movement of the slider 420 in the directions indicated by arrows 423 and 424. This cam action causes the card 410 to be lowered into or lifted from, respectively, the slot 230a. The sliders 420 slide in the directions indicated by arrows 423 and 424 along flanges 430a formed in the lower edge of the lead frames 430. FIG. 10 illustrates a perspective view of one of the sliders 420, one of the cards 410, and one of the edge card connectors 230 shown in FIG. 9 with the front panel 401 shown in FIG. 9 removed. FIG. 11 illustrates a perspective view of one of the sliders 420 shown in FIG. 9 with one of the side walls 421 removed to reveal the cams 425 formed in the interior surface 426 of the side wall 422 of the slider 420.

The manner in which the cards 410 are engaged with and disengaged from the slots 230a will now be described with reference to FIGS. 9-11. In FIG. 9, the slider 420 is in its retracted position as the card 410 is being extracted from the front panel 401. In FIG. 10, the card 410 is shown engaged with the slot 230a of the edge card connector 230. The cam followers that are located on the lead frame 430 are not shown for ease of illustration, but they are typically round pins having diameters that are slightly smaller than the width of the tracks 425a that form the cams 425. When the slider 420 is pulled by the user in the direction indicated by arrow 424, the cam followers located on the lead frame 430 move in the direction indicated by arrow 435 within their respective tracks 425a, which causes the card 410 to be raised out of the slot 230a. The user can then extract the card 410 from the front panel 401.

When the user inserts the card 410 through the opening formed in the front panel 401 such that a stop 441 on the slider 420 of butts the front panel 401, the slider 420 moves in the direction indicated by arrow 423, which causes the cam followers to move in the directions indicated by arrow 436 within their respective tracks 425a. This cam action causes the card 410 to be lowered into the slot 230a of the edge card connector 230.

As indicated above, the invention is not limited with respect to the type or configuration of the parallel optical transceiver module that is mounted on the card. Examples of parallel optical transceiver module that is suitable for this purpose is disclosed in U.S. Pat. Nos. 7,331,720, and 8,036,500, which are assigned to the assignee of the present application and which are incorporated by reference herein in their entireties.

The invention also is not limited with respect to the edge-mounting or mid-plane mounting configurations that are used to mount the cards in the edge card connectors. Likewise, the invention is not limited with respect to the types or configurations of the edge card connectors that are used for this purpose. A few examples of suitable edge-mounting and mid-plane mounting configurations have been described above with reference to FIGS. 1-11 in order to demonstrate the principles and concepts of the invention. Those skilled in the art will understand that the invention is not limited to these illustrative embodiments. As will be understood by those skilled in the art in view of the description being provided herein, modifications may be made to the embodiments described to provide a system that achieves the goals of the invention, and all such modifications are within the scope of the invention.

What is claimed is:

1. An optical communications system comprising:
   a motherboard;
   a first edge card connector mounted on a major surface of the motherboard, the first edge card connector having at least first and second side walls separated from one another by an air gap that constitutes a slot in the edge card connector, the first edge card connector including a first set of electrical contacts disposed on an inner surface of the first side wall and a second set of electrical contacts disposed on an inner surface of the second side wall; and
   a first optical communications card comprising at least two parallel optical communications modules mounted on a first major surface of the first optical communications card and at least two other parallel optical communications modules mounted on a second major surface of the first optical communications card, each parallel optical communications module including at least one of a plurality of transmit channels or a plurality of receive channels, the first optical communications card further comprising a plurality of electrical contacts disposed on a first portion of an edge of the first optical communications card, wherein the edge is insertable into the slot of the first edge card connector such that the first optical communications card and the first edge card connector are electrically interconnected with one another.

2. The optical communications system of claim 1, further comprising:
a second edge card connector mounted on the major surface of the motherboard, the second edge card connector having at least first and second side walls separated from one another by an air gap that constitutes a slot in the second edge card connector; and
a second optical communications card comprising at least two parallel optical communications modules mounted on a first major surface of the second optical communications card and at least two other parallel optical communications modules mounted on a second major surface of the second optical communications card, each parallel optical communications module including at least one of a plurality of transmit channels or a plurality of receive channels, the second optical communications card having an edge inserted into the slot of the second edge card connector such that the second optical communications card and the second edge card connector are electrically interconnected with one another.

3. The optical communications system of claim 1, further comprising:
a housing portion having at least a lower panel, the motherboard CB being mounted on the lower panel, the first and second edge card connectors being mid-plane mounted on the first surface of the motherboard CB.

4. The optical communications system of claim 1, further comprising:
a housing portion having at least a lower panel and a front panel, the motherboard CB being mounted on the lower panel, the front panel having at least a first opening formed therein through which the first optical communications card is inserted;
at least a first guide systems disposed in the housing portion above the first edge card connector, the first guide system engaging the first optical communications card inserted through the first opening, the first guide system being configured to guide the first optical communications card in directions parallel to a direction of the slot of the first optical communications card; and
at least first actuator mechanism mechanically coupled to the first guide system, the first actuator mechanism being configured to cause the first guide system to lower the first optical communications card into the slot of the first edge card connector if the first actuator mechanism is placed in a first state of actuation by a user, the first actuator mechanism being configured to cause the first guide system to lift the first optical communications card out of the slot of the first edge card connector if the first actuator mechanism is placed in a second state of actuation by a user.

5. The optical communications system of claim 1, further comprising:
at least a first optical fiber cable having a first end that is connected to the first POCM, the first optical fiber cable having a plurality of optical fibers, each of the optical fibers having a first end that is mechanically coupled to the first POCM.

6. An optical communications system comprising:
a motherboard;
a plurality of edge card connectors mounted on a major surface of the motherboard; and
a plurality of optical communications cards, each card having at least two parallel optical communications modules mounted on a first major surface and at least two other parallel optical communications modules mounted on a second major surface, each parallel optical communications module including at least one of a plurality of transmit channels or a plurality of receive channels, an edge of each of the plurality of optical communications cards inserted into a respective one of the plurality of edge card connectors such that the respective one of the optical communications card and the respective edge card connector are electrically interconnected with one another.

7. A method for mounting parallel optical communications modules on a motherboard of an optical communications system, the method comprising:
providing a first edge card connector on a major surface of a motherboard, the first edge card connector having at least first and second side walls separated from one another by an air gap that constitutes a slot in the first edge card connector, the first edge card connector including first and second sets of electrical contacts, the first set of electrical contacts disposed on an inner surface of the first side wall and the second set of electrical contacts disposed on an inner surface of the second side wall; and
inserting at least a first portion of a first optical communications card into the slot of the first edge card connector, the first optical communications card comprising at least two parallel optical communications modules mounted on a first major surface of the first optical communications card and at least two other parallel optical communications modules mounted on a second major surface of the first optical communications card, each parallel optical communications module including at least one of a plurality of transmit channels or a plurality of receive channels, the first optical communications card having electrical contacts disposed on a first portion of an edge of the first optical communications module such that the first optical communications card and the first edge card connector are electrically interconnected with one another when the first portion of the first optical communications card is inserted into the slot of the first edge card connector.

8. The method of claim 7, further comprising:
providing a second edge card connector on the major surface of the motherboard, the second edge card connector having at least first and second side walls separated from one another by an air gap that constitutes a slot in the second edge card connector; and
inserting at least a first portion of a second optical communications card into the slot of the second edge card connector, the second optical communications card comprising at least two parallel optical communications modules mounted on a first major surface of the second optical communications card and at least two other parallel optical communications modules mounted on a second major surface of the second optical communications card, each parallel optical communications module including at least one of a plurality of transmit channels or a plurality of receive channels, the second optical communications card having electrical contacts disposed on a first portion of an edge of the second edge card connector such that the second optical communications card and the second edge card connector are electrically interconnected with one another when the first portion of the second optical communications card is inserted into the slot of the second edge card connector.

9. The method of claim 6, wherein the motherboard CB is mounted on a lower panel of a housing portion of an optical communications system, and wherein the first and second edge card connectors are mid-plane mounted on the first surface of the motherboard CB.

10. The method of claim 6, wherein the motherboard CB is mounted on a lower panel of a housing portion that includes the lower panel and a front panel, the front panel having at least a first opening formed therein through which the first optical communications card is inserted, and wherein the process of inserting the first optical communications card into the slot of the first edge card connector comprises:
   with at least a first guide systems disposed in the housing portion above the first edge card connector, engaging the first optical communications card inserted through the first opening, the first guide system being configured to guide the first optical communications card in directions parallel to a direction of the slot of the first optical communications card; and
   with at least first actuator mechanism mechanically coupled to the first guide system, causing the first guide system to lower the first optical communications card into the slot of the first edge card connector by placing the first actuator mechanism in a first state of actuation.

11. The method of claim 10, further comprising:
   with at least the first actuator mechanism, causing the first guide system to lift the first optical communications card out of the slot of the first edge card connector by placing the first actuator mechanism in a second state of actuation.

12. The optical communications system of claim 1, wherein the second major surface of the first optical communications card is located on a reverse side of the first major surface of the first optical communications card, and further comprising:
   a first cover that is secured to the first major surface of the first optical communications card for protecting the at least two parallel optical communications modules.

13. The optical communications system of claim 12, further comprising:
   a second cover that is secured to the second major surface of the first optical communications card for protecting the at least two other parallel optical communications modules.

14. The optical communications system of claim 1, further comprising:
   a strain relief device secured to one end of the first optical communications card, the strain relief device made of metal.

15. The optical communications system of claim 14, wherein the strain relief device made of metal is configured as an electromagnetic interference (EMI) shield.

16. The optical communications system of claim 1, wherein no electrical contacts are provided on a second portion of the edge of the first optical communications card and wherein when the first optical communications card is inserted into the slot of the first edge card connector, the second portion abuts a first subset of electrical contacts disposed on the inner surface of the first side wall and a second subset of electrical contacts disposed on the inner surface of the second side wall.

* * * * *